United States Patent
Huang et al.

(10) Patent No.: US 6,870,732 B2
(45) Date of Patent: Mar. 22, 2005

(54) ATTACHED PANEL ARRANGEMENT OF A PORTABLE COMPUTER

(75) Inventors: Chao-Ming Huang, Taipei (TW); Wen-Chieh Wang, Taipei (TW); Chang-Ming Yan, Taipei (TW)

(73) Assignee: Tatung Co., Ltd., Taipei (TW)

( * ) Notice: Subject to any disclaimer, the term of this patent is extended or adjusted under 35 U.S.C. 154(b) by 121 days.

(21) Appl. No.: 10/445,932

(22) Filed: May 28, 2003

(65) Prior Publication Data

US 2004/0174670 A1 Sep. 9, 2004

(30) Foreign Application Priority Data

Mar. 7, 2003 (TW) ........................................ 92203515 U

(51) Int. Cl.$^7$ ................................................. G06F 1/16
(52) U.S. Cl. ........................ 361/683; 361/681; 220/230; 345/168
(58) Field of Search ................................. 361/679–686; 220/230; 312/223.1, 223.2; 345/168, 169

(56) References Cited

U.S. PATENT DOCUMENTS

| | | | | |
|---|---|---|---|---|
| 5,175,672 A | * | 12/1992 | Conner et al. | ............... 361/680 |
| 6,351,372 B1 | * | 2/2002 | Kim | ........................... 361/683 |
| 6,366,440 B1 | * | 4/2002 | Kung | ......................... 361/681 |
| 6,421,235 B2 | * | 7/2002 | Ditzik | ........................ 361/683 |
| 6,510,048 B2 | * | 1/2003 | Rubenson et al. | ........... 361/680 |
| 6,741,456 B2 | * | 5/2004 | Sellers | ....................... 361/681 |
| 2003/0021082 A1 | * | 1/2003 | Lu et al. | ..................... 361/683 |

* cited by examiner

*Primary Examiner*—Lisa Lea-Edmonds
(74) *Attorney, Agent, or Firm*—Bacon & Thomas PLLC

(57) ABSTRACT

A portable computer host has a display face, a back face and four side faces. First magnetic units and at least one positioning unit are placed on the display face or the back face. An attached panel, having an attaching face and four edges, has second magnetic units placed on the attaching face that correspond to the first magnetic units, and also has at least one second positioning unit placed on the attaching face corresponding to the first positioning unit.

5 Claims, 3 Drawing Sheets

ATTACHED PANEL ARRANGEMENT OF A PORTABLE COMPUTER

BACKGROUND OF THE INVENTION

1. Field of the Invention

The present invention relates to an attached panel arrangement of a portable computer. More particularly, the present invention discloses an arrangement for assembling a portable computer host and an attaching board such as a keyboard set or a cover.

2. Description of Related Art

Portable computers are becoming even more popular than desktop computers. The different types of portable computers include notebooks, tablet computers, webpads, PDAs (personal digital assistants), etc. The portable computer has a portable computer host and a separate keyboard, a cover or other peripheral attached elements.

The main purpose of the above-mentioned portable computer is to be easy to carry and to use. However, there is no connecting structure between the portable computer host and a separate keyboard, cover or other peripheral attached elements. Therefore, while carrying the portable computer, the portable computer host and the other peripheral attached elements need to be carried separately, which can be inconvenient, and may occupy too much space to arrangement.

Therefore, it is desirable to provide an improved assemble structure for a portable computer to mitigate and/or obviate the aforementioned problems.

SUMMARY OF THE INVENTION

A main objective of the present invention is to provide an attached panel arrangement of a portable computer, which can improve the carrying convenience of the portable computer host and the peripheral attached elements, and reduce the arrangement space of the portable computer host with its related portable elements.

Another objective of the present invention is to provide an attached panel arrangement of a portable computer that can be attached to and separated from the portable computer host and the peripheral attached elements quickly.

In order to achieve the above-mentioned objectives, the present invention provides an attached panel arrangement of a portable computer that comprises a portable computer host comprising a display face, a back face, four side faces, a plurality of first magnetic units, and at least one first positioning unit, wherein the first magnetic units and the at least one first positioning unit being placed on one of the display face and the back face; and an attached panel comprising an attaching face, four edges, a plurality of second magnetic units, and at least one second positioning unit, wherein the second magnetic units being placed on the attaching face respectively corresponding to the first magnetic units, and the at least one second positioning unit placed on the attaching face respectively corresponding to the at least one first positioning unit.

When the portable computer host is placed on the attached panel, the magnetic attraction force between the magnetic units can hold the portable computer host and the attached panel together, and the positioning units can position the portable computer host and the attached panel correctly with respect to each other. Therefore, the portable computer host and the attached panel can be considered a single unit that can be carried or packed together to reduce the overall size.

Furthermore, the magnetic units and the positioning units of the present invention enable the portable computer host and the peripheral attached elements be easily separated and combined.

In the present invention, the attached panel can be a cover; or further comprises a keyboard set placed on the attaching face to form a separate keyboard; or may comprise a touch control panel, a mouse or other peripheral attached elements.

The first and second magnetic units can both be magnetized, such as two oppositely aligned magnetic poles, or one may be magnetized, and the other magnetic, such as an appropriate magnetic metal.

Furthermore, the first positioning unit can be a protrusion and the second positioning unit can be a corresponding groove, or visa versa. The present invention further comprises an auxiliary jam structure; one of the side faces forms at least one fastening groove, and one of the edges corresponding to the side face having the fastening groove forms at least one fastening rib that matches the fastening groove.

Other objectives, advantages, and novel features of the invention will become more apparent from the following detailed description when taken in conjunction with the accompanying drawings.

DETAILED DESCRIPTION OF THE PREFERRED EMBODIMENT

Illustrative embodiments of the invention are described below. In the interest of clarity, not all features of an actual implementation are described in this specification.

Figure 1:
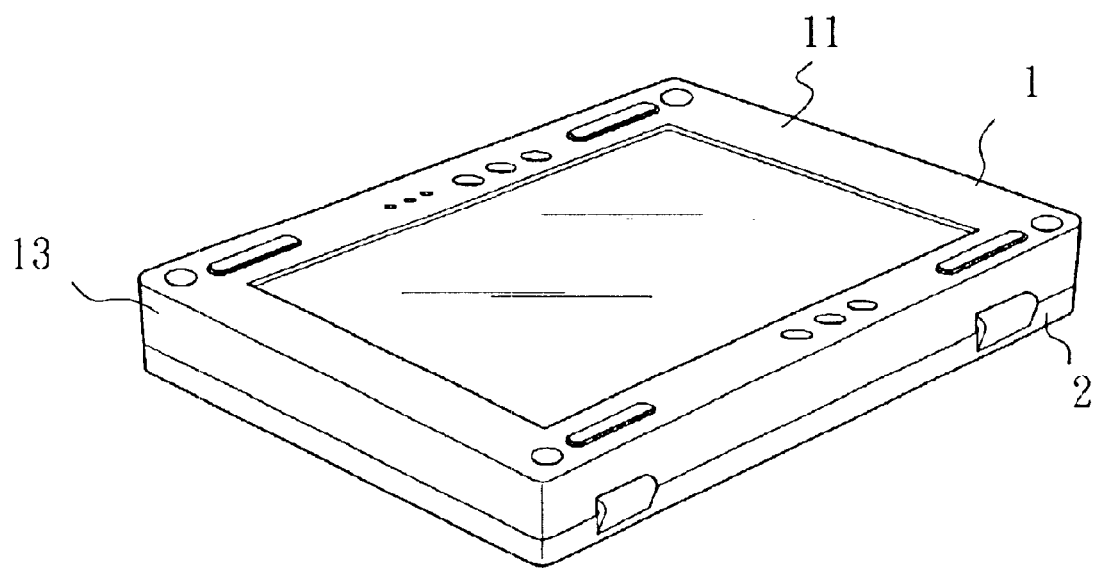
FIG. 1 is a perspective view of an embodiment of the present invention.
Figure 2:
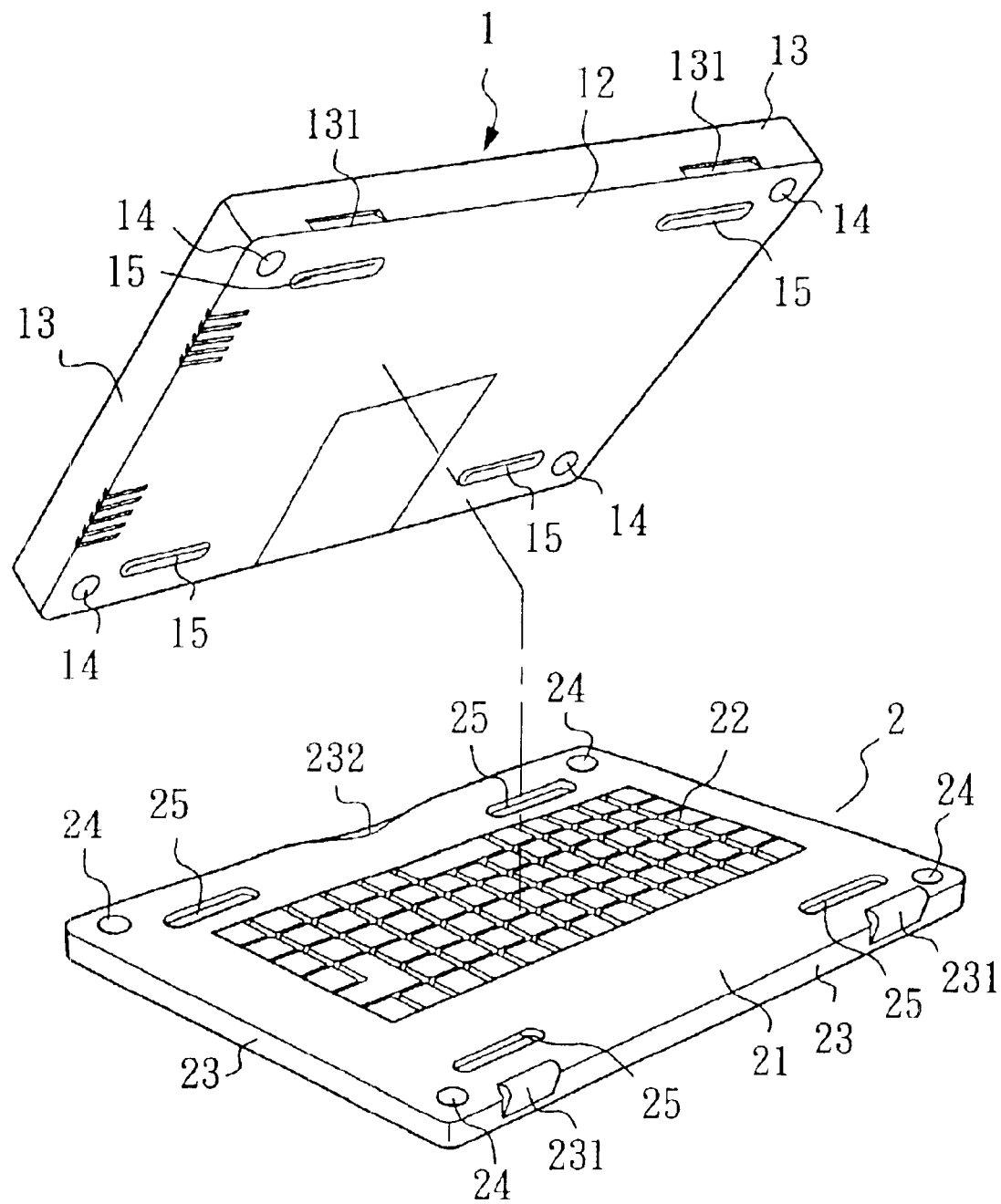
FIG. 2 is an exploded view of the embodiment of the present invention.

Please refer to FIG. 1. FIG. 1 is a perspective view of an embodiment of the present invention, which shows an attached panel arrangement of a portable computer, comprises a portable computer host 1 and an attached panel 2. Also refer to FIG. 2. FIG. 2 is an exploded view of the embodiment of the present invention. The portable computer host 1 comprises a display face 11, a back face 12, four side faces 13, four first magnetic units 14 (such as four magnetized bars with similarly aligned positive poles) disposed near four corners of the back face 12, and four positioning units 15 (such as four protrusions) deposited on the back face 12. The portable computer host 1 is using a tablet PC in this embodiment. The attached panel 2 further comprises an attaching face 21, four edges 23, four second magnetic units 24 (such as four magnetized bars with similarly aligned negative poles), and four second positioning units 25 (such as four grooves), wherein the four second magnetic units 24 placed on the attaching face 21 respectively corresponding to the four first magnetic units 14, and four second positioning units 25 placed on the attaching face 21 respectively corresponding to the four first positioning units 15. Therefore, the first magnetic units 14 and the second magnetic units 24 are attracted to each other, and the first positioning units 15 and the second positioning units 25 clip together. In this embodiment, the attaching face 21 of the attached panel 2 further comprises a keyboard set 22 for providing keyboard-style input.

When the portable computer host 1 is attached to the attached panel 2, the magnetic attraction between the first magnetic units 14 and the second magnetic units 24 holds the portable computer host 1 and the attached panel 2 tightly together, and the first positioning units 15 and the second positioning units 25 correctly orient the portable computer host 1 and the attached panel 2. Therefore, the portable computer host 1 and the attached panel 2 may be treated as a single unit that can be carried or packed together to reduce the overall size. The attached panel arrangement of a portable computer of the present invention can improve the carrying convenience of the portable computer host 1 and the attached panel 2, and reduce the total occupied space to arrangement. Furthermore, the magnetic units and the positioning units of the present invention enable the portable computer host and the peripheral attached elements to be easily separated and combined.

In this embodiment, one side face 13 of the portable computer host 1 forms two fastening grooves 131, and one edge 23 corresponding to the side face 13 having the fastening grooves 131 forms two fastening ribs 231 that match the fastening groove 131. When a user wants to close the assembly, he or she pushes the side face 13 of the portable computer host 1 with two fastening grooves 131 into the two fastening ribs 231, and rotates the portable computer host 1 so that the back face 12 faces the keyboard set 22 and the attaching face 21, closing the unit. Furthermore, an edge 23 of the attached panel 2, opposite the side face 13, comprises an indentation 232, which permits a user to apply a force thereon to open the unit.

Figure 3:
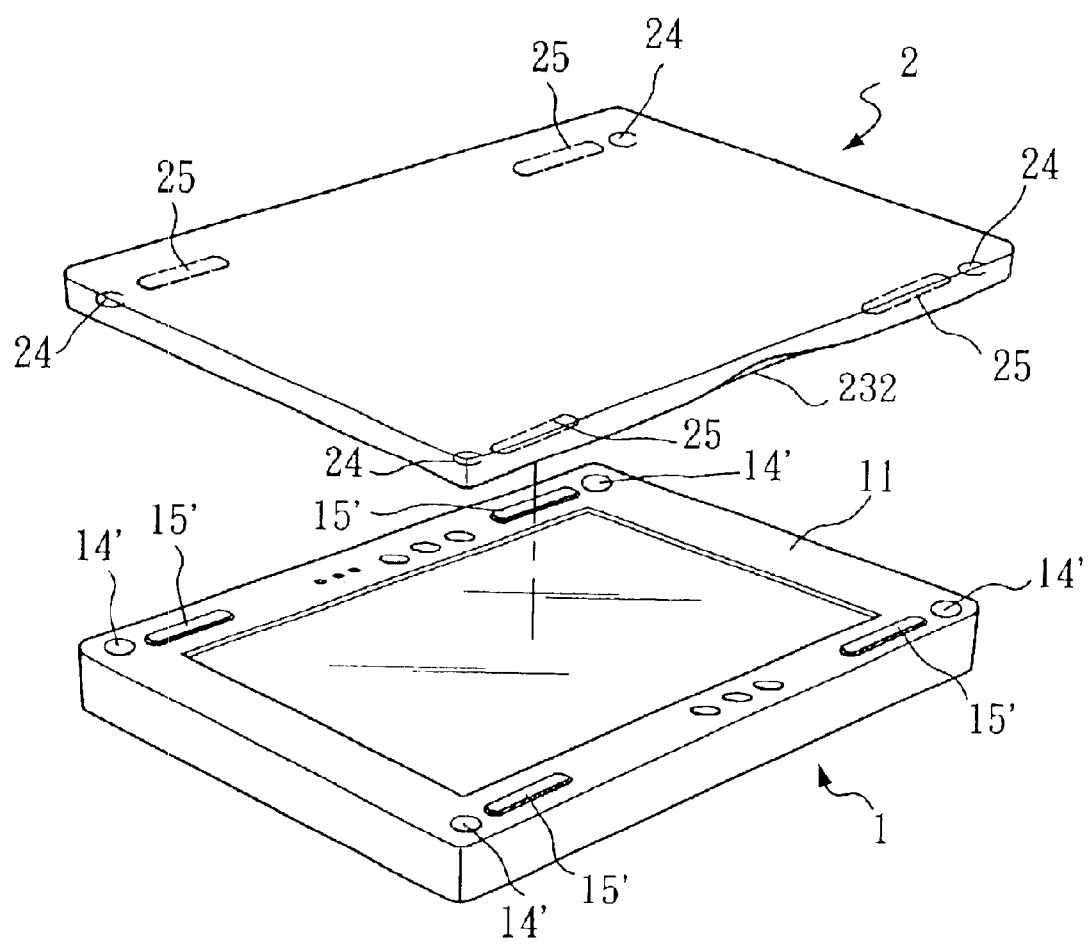
FIG. 3 is an exploded view of another embodiment of the present invention.

Please refer to FIG. 3. FIG. 3 is an exploded view of another embodiment of the present invention. In this embodiment, the primary structure is similar to that of the above-mentioned embodiment, the main difference being that the first magnetic units 14' and the first positioning units 15' are placed on the display face 11, so that the attached panel 2 covers the display face 11 to protect the display face 11 from impact or scratching. In other words, the attached panel 2 can be attached on to the back face 12 (as shown in FIG. 2) of the portable computer host 1, or on to the display face 11 of the portable computer host 1.

The invention has been described using exemplary preferred embodiments. However, for those skilled in this field the preferred embodiments can be easily adapted and modified to suit additional applications without departing from the spirit and scope of this invention. Thus, it is to be understood that the scope of the invention is not limited to the disclosed embodiments. On the contrary, it is intended to cover various modifications and similar arrangements based upon the same operating principle. The scope of the claims, therefore, should be accorded the broadest interpretations so as to encompass all such modifications and similar arrangements.

Although the present invention has been explained in relation to its preferred embodiment, it is to be understood that many other possible modifications and variations can be made without departing from the spirit and scope of the invention as hereinafter claimed.

What is claimed is:

1. An attached panel arrangement of a portable computer comprising:
   a portable computer host comprising a display face, a back face, four side faces, a plurality of first magnetic units, and at least one first positioning unit, wherein said first magnetic units and said at least one first positioning unit being placed on one of said display face and said back face; and
   an attached panel comprising an attaching face, four edges, a plurality of second magnetic units, and at least one second positioning unit, wherein said second magnetic units being placed on said attaching face respectively corresponding to said first magnetic units, and said at least one second positioning unit placed on said attaching face respectively corresponding to said at least one first positioning unit.

2. The attached panel arrangement of a portable computer as claimed in claim 1 wherein said attaching face of said attached panel further comprises a keyboard.

3. The attached panel arrangement of a portable computer as claimed in claim 1 wherein said first positioning unit is a protrusion and said second positioning unit is a groove.

4. The attached panel arrangement of a portable computer as claimed in claim 1 wherein one of said side faces forming at least one fastening groove, and one of said edges corresponding to the side face having said fastening groove forming at least one fastening rib that matches said fastening groove.

5. The attached panel arrangement of a portable computer as claimed in claim 1 wherein one of said side faces further forming an indentation.

* * * * *